2,835,637

PRODUCTION OF ALUMINA/SILICA CATALYSTS

Dennis Albert Dowden, Leslie Victor Johnson, and George Clarkson Vincent, Norton-on-Tees, England, assignors to Imperial Chemical Industries Limited, London, England, a corporation of Great Britain No Drawing. Application November 22, 1954
Serial No. 470,546

Claims priority, application Great Britain December 18, 1953

1 Claim. (Cl. 252—432)

This invention relates to the production of alumina/silica catalysts.

Alumina-silica catalysts are widely used in industrial processes, for example, in the catalytic cracking of petroleum fractions. Alumina-silica catalysts are usually prepared by a precipitation process which involves many operations, for example precipitation of gels, filtration, washing, ion-exchange, drying and sometimes pelleting. Catalysts produced by such a complicated series of operations, which involve the repeated handling of large volumes of liquid, precipitate and powder, are costly.

It is known to prepare skeletal glasses, i. e., glasses possessing a porous or skeletal structure, by heating the glass to cause phase separation and then extracting a soluble phase. A process for the production of an alumina-silica catalyst in the form of a skeletal glass is much less costly than the precipitation process described above. However processes for the production of such skeletal glass catalysts have so far only been applied to glasses made from materials containing alkali metal oxides. Such glasses due to the presence of an alkali metal oxide possess the desirable feature of relatively low fusion temperature but the use of skeletal catalysts made from them is restricted since alkali metals are very effective catalyst poisons in many processes.

We have found that a glass having the desirable feature of a relatively low fusion temperature may be prepared from a mixture substantially free from alkali metals, comprising alumina, silica, boric oxide and an alkaline earth metal oxide and that such a glass after subjection to a temperature sufficient to cause phase separation and extraction of at least part of at least one soluble phase yields a skeletal glass of good mechanical strength and catalytic activity.

Throughout the specification "an alkaline earth metal oxide" is to be taken to include magnesia.

According to the present invention therefore, there is provided a process for the production of a skeletal glass catalyst containing silica and alumina and substantially free from alkali metals which comprises the steps of fusing a uniform mixture, substantially free from alkali metals, containing alumina, silica, boric oxide and an alkaline earth metal oxide to produce a glass, subjecting the glass to a temperature sufficient to cause separation of phases at least one of which is soluble in an extraction medium and extracting at least part of at least one soluble phase to produce the desired skeletal structure.

The glass may be formed by fusing the powdered mixed raw materials containing alumina, silica, alkaline earth metal oxide and boric oxide according to the known methods of the glass industry. While it is preferred that the alumina, silica, alkaline earth metal oxide and boric oxide are present in forms which when mixed and heated most readily fuse to form a glass, the oxides may be present either in the free state or in the form of suitable compounds provided that the mixture is substantially free from alkali metals and other undesired elements, for example, iron. Examples of suitable compounds are alkaline earth silicates, aluminates and borates. Alkaline earth metal salts, such as calcium carbonate, which decompose below the temperature at which the glass is produced to yield a solid residue consisting only of the alkaline earth, may also be used.

We have found that a glass having a composition, prior to the phase separation and extraction processes, within the following limits is particularly suitable for use in the process of the invention:

|  | Percent |
|---|---|
| Alumina | 10 to 35 |
| Silica | 30 to 60 |
| Alkaline earth | 5 to 20 |
| Boric oxide | 12 to 22 |

Since some boric oxide is lost by volatilisation during the fusion process it is necessary to allow for this loss when mixing the raw materials. Deviation from the above composition may result in phase separation failing to occur on heating, or if phase separation does occur, it may not be possible preferentially to extract one phase. The final skeletal structure may also be mechanically weak. Also, if the glass contains a lower proportion of boric oxide or alkaline earth metal oxide than specified above, the fusion temperature may be too high for economical manufacture. It is preferred that the fusion temperature of the glass should be not greater than 1500° C.

The glass may be formed by any of the known methods of the glass industry, into shapes of the desired size, for example spheres of say, ¼ to ½ inch diameter, or rods of say, 3/16 inch diameter and ¼ to 3/16 inch length. Alternatively, the glass after solidification, may be broken up into roughly shaped pieces preferably of such a size that they pass a 3/16 inch mesh sieve and are retained by a ⅛ inch mesh sieve.

The glass is subjected to a temperature sufficient to cause separation of the glass into intermingled phases, at least one of which is soluble in an extraction medium. The temperature employed depends upon the composition of the glass but we have found that the separation of phases is usually sufficiently complete after maintaining a temperature of 650° to 950° C. for 24 hours. Melting the glass destroys the phase separation and therefore any process for forming the glass into desired shapes which involves melting the glass should be carried out prior to phase separation. On the other hand processes for the reduction of the mass of glass into smaller pieces which do not involve melting the glass, for example, breaking the glass mechanically, may be carried out subsequent to the phase separation process.

After the glass has been heated to effect separation of phases it is then subjected to an extraction process. Either partial extraction of the surface layers or complete extraction of the whole glass particle may be carried out and the final skeletal glass may have a specific surface varying between 10 and 500 square metres per gram. A variety of extraction media may be used, the choice of a particular medium depending on a number of factors, for example, the composition of the glass and the degree of extraction desired. We have found that a convenient extraction medium is boiling dilute hydrochloric acid of a concentration varying between N/5 and 2 N. Other concentrations of hydrochloric acid solution or other strong acids for example, sulphuric and nitric acids may however be used. The period that is necessary for the glass to remain in contact with the extraction medium to obtain a given degree of extraction depends on the composition of the glass, on the concentration of the acid employed and to a limited extent on the particular acid used.

EXAMPLE 20 parts alumina, 35 parts silica, 10 parts magnesia and 40 parts boric oxide, all materials substantially free from sodium and iron, were thoroughly mixed and fused at 1400° C. to give a glass having the following composition:

| | Percent |
|---|---|
| Alumina | 27 |
| Silica | 47 |
| Magnesia | 11 |
| Boric oxide | 15 |

The fused glass was poured onto a flat metal plate and after it had solidified it was broken up into small pieces substantially all of which were retained on a ⅛ inch mesh sieve and passed a ¼ inch mesh sieve. These pieces of glass were then heated at 700° C. for 24 hours to ensure phase separation and after cooling, immersed in hot 2 N hydrochloric acid for 10 hours to extract the soluble phase, washed with water and dried. It was found that the glass had decreased in weight by about 40% but that its volume was substantially unchanged.

The catalytic activity of the skeletal glass prepared as described above was tested in processes of hydrocarbon dealkylation, hydrocarbon isomerisation, and alcohol dehydration. The results are given below:

*Dealkylation.*—A mixture of isomeric butyl benzenes containing 70% tertiary butyl benzene was vapourised and passed at a rate corresponding to 2 litres of liquid butylbenzene per litre of catalyst filled space per hour through a bed of the above described catalyst maintained at a temperature of 400° C. 62% conversion to benzene and butene was obtained compared with 54% conversion when employing an alumina-silica bead catalyst under the same operating conditions. Further tests carried out with the skeletal glass catalyst under the same operating conditions gave conversions of butyl benzenes to benzene and butene of 73.5% and 76.5%.

*Isomerization.*—A mixture of isomeric xylenes containing 95% para-xylene was vapourised and passed at a rate of corresponding to 1 litre of liquid xylenes per litre of catalyst filled space per hour through a bed of the above described catalyst maintained at a temperature of 430° C. The product contained 40% para-xylene. Further tests carried out under the same operating conditions yielded products containing 28.5% and 34% para-xylene.

*Alcohol dehydration.*—Isopropanol was vapourised and passed at a rate corresponding to 2 litres of liquid isopropanol per litre of catalyst filled space per hour through a bed of the catalyst maintained at a temperature of 240° C. 83% of the isopropanol was converted to propylene. In further tests carried out under the same operating conditions except that the isopropanol vapour was passed through the catalyst at a rate corresponding to 10 litres of liquid isopropanol per litre of catalyst filled space per hour 92.6% to 100% of the isopropanol was converted to propylene.

We claim:

A process for the production of a skeletal glass catalyst consisting essentially of silica and alumina which comprises treating a glass substantially free from alkali metals and having the composition:

| | Percent |
|---|---|
| Alumina | 10–35 |
| Silica | 30–60 |
| Magnesia | 5–20 |
| Boric oxide | 12–22 | by subjecting said glass to a temperature within the range of 650° to 950° C. for a period of at least 24 hours to cause a separation of phases, at least one of said phases being soluble in an extraction medium consisting essentially of a boiling aqueous solution of a strong mineral acid, and extracting with said extraction medium at least part of said soluble phase in an amount up to about 40% of the total weight of said glass, whereby said skeletal glass is obtained.

References Cited in the file of this patent
UNITED STATES PATENTS

| | | |
|---|---|---|
| 2,355,746 | Nordberg | Aug. 15, 1944 |
| 2,480,672 | Plank | Aug. 30, 1949 |
| 2,500,092 | Parker | Mar. 7. 1950 |
| 2,500,801 | Church | Nov. 7, 1950 |